United States Patent
Moore et al.

(10) Patent No.: US 8,266,301 B2
(45) Date of Patent: Sep. 11, 2012

(54) DEPLOYMENT OF ASYNCHRONOUS AGENTLESS AGENT FUNCTIONALITY IN CLUSTERED ENVIRONMENTS

(75) Inventors: David Paul Moore, Mudgeeraba (AU); Zoran Radenkovic, Robina (AU); John T. Robertson, Broadbeach (AU)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 12/397,734

(22) Filed: Mar. 4, 2009

(65) Prior Publication Data

US 2010/0228849 A1    Sep. 9, 2010

(51) Int. Cl.
    G06F 15/16    (2006.01)
    G06F 15/173   (2006.01)
(52) U.S. Cl. ........ 709/228; 709/227; 709/229; 709/223; 709/224; 709/226
(58) Field of Classification Search .......... 709/201–203, 709/223, 224, 226, 227–229
See application file for complete search history.

(56) References Cited

U.S. PATENT DOCUMENTS

| | | | |
|---|---|---|---|
| 7,155,501 B2 * | 12/2006 | Mandal et al. ................ | 709/223 |
| 7,480,666 B2 * | 1/2009 | Boyle et al. ............................ | 1/1 |
| 7,912,844 B2 * | 3/2011 | Boyle et al. .................... | 707/754 |
| 8,024,296 B1 * | 9/2011 | Gopinathan et al. .......... | 707/648 |
| 8,140,635 B2 * | 3/2012 | DiFalco ........................ | 709/207 |
| 2005/0120101 A1 * | 6/2005 | Nocera ......................... | 709/223 |
| 2006/0064481 A1 * | 3/2006 | Baron et al. ................. | 709/224 |
| 2006/0212932 A1 * | 9/2006 | Patrick et al. ................... | 726/11 |
| 2007/0106769 A1 * | 5/2007 | Liu ................................ | 709/223 |
| 2007/0198328 A1 * | 8/2007 | Fuller et al. ..................... | 705/10 |
| 2008/0155233 A1 * | 6/2008 | Ward et al. ..................... | 712/220 |
| 2009/0144319 A1 * | 6/2009 | Panwar et al. ................ | 707/102 |
| 2009/0187651 A1 * | 7/2009 | Schuckenbrock et al. .... | 709/224 |
| 2010/0088150 A1 * | 4/2010 | Mazhar et al. ................. | 705/10 |

OTHER PUBLICATIONS

Corradi et al., "Melding Abstractions with Mobile Agents", Proceedings of the Second International Workshop on Cooperative Information Agents II, Learning, Mobility and Electronic Commerce for Information Discovery on the Internet, 1998, pp. 278-289 http://www-lia.deis.unibo.it/Research/TechReport/lia97011.pdf.
U.S. Appl. No. 11/944,574, filed Nov. 23, 2007, Moore et al.

* cited by examiner

*Primary Examiner* — Hieu Hoang
(74) *Attorney, Agent, or Firm* — Yee & Associates, P.C.; John D. Flynn (57) ABSTRACT

A mechanism for the deployment of asynchronous agentless agent functionality in clustered environments. An agentless agent execution node in an agentless agent execution node cluster receives a context message comprising an asynchronous operation request and an execution context from a messaging service. The agent node determines if an entry for the execution context exists in an execution context state table of the agent node. If no entry exists, the agent node creates an execution context entry in the execution context state table of the agent node. The agent node retrieves an asynchronous code module associated with the asynchronous operation from a central repository. The asynchronous code module is then executed on a managed resource to detect asynchronous code events occurring on the managed resource. When asynchronous code events are detected at the managed resource, the agent node sends a message comprising the asynchronous code events to a management server.

20 Claims, 6 Drawing Sheets

DEPLOYMENT OF ASYNCHRONOUS AGENTLESS AGENT FUNCTIONALITY IN CLUSTERED ENVIRONMENTS

BACKGROUND

1. Field

The disclosure relates generally to an improved data processing system, and more specifically to deployment of asynchronous agentless agent functionality in clustered environments.

2. Description of the Related Art

In a computer management environment, one or more central servers or controllers are used to manage a plurality (and often a large number) of other target resources. Target resources can be any type of computer device, including personal computer systems, servers, workstations, mainframes, peripherals, network devices, etc. The servers may perform work on multiple target resources within a network by interrogating, configuring, controlling, or otherwise communicating with the target resources. Common methods for managing target resources fall into two broad categories: agent-based and agentless methods.

In an agent-based method, specific agent applications are installed on each target device that needs to be managed. A central management server communicates with the locally-installed agent, which then communicates with the local OS to coordinate the desired management process on the target resource. However, agent-based methods can introduce management problems because the agents must themselves be deployed, installed, and updated on the target resources, which results in increased cost and complexity in managing the agents on each resource.

Agentless agents, or agents with a zero footprint, are a common form of agents in management systems. In an agentless method, the management system has knowledge of target devices on the network it manages. This knowledge may be derived through manual user registration, automatic discovery, or a combination of both. An agentless agent has a zero footprint in that the agent does not have an execution module installed on the managed target resource, but rather on an execution point external to the target resource.

Agentless agents provide an interface abstraction of the target resource to be managed. In particular, an agentless agent relies on a remote administration capability in the form of an exposed application programming interface (API) or remote console for the managed resource. Because the agent is not installed on the target device, the agent typically performs operations on the target device in a synchronous manner. For instance, to conduct a management operation on a target resource, execution code is retrieved from a repository, and temporarily installed on an execution point. Depending on the nature of the managed resource, the execution point may be a separate node or in a node cluster. The code is executed, and a response is sent to the management system before the execution code is removed from the execution point. This agentless method may be augmented by temporarily storing or caching the execution code at the execution point to improve performance if the code is used frequently. If, after a predetermined period the execution code is not used, the code is removed from the cache.

SUMMARY

The illustrative embodiments provide a mechanism for the deployment of asynchronous agentless agent functionality in clustered environments. An agentless agent execution node in an agentless agent execution node cluster receives a context message from a messaging service. The context message includes a management operation request comprising an asynchronous operation and an execution context of the asynchronous operation. The agent node determines if an entry for the execution context exists in an execution context state table of the agent node. If no entry for the execution context exists, the agent node creates an entry for the execution context in the execution context state table of the agent node. The agent node retrieves an asynchronous code module associated with the asynchronous operation in the management operation request from a central repository. The asynchronous code module is then executed on a managed resource to detect asynchronous code events occurring on the managed resource. Responsive to detecting asynchronous code events at the managed resource, the agent node sends a message comprising the asynchronous code events to a management server.

DETAILED DESCRIPTION

As will be appreciated by one skilled in the art, the embodiments in the disclosure may be embodied as a system, method or computer program product. Accordingly, the embodiments in the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments in the disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments in the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments in the disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
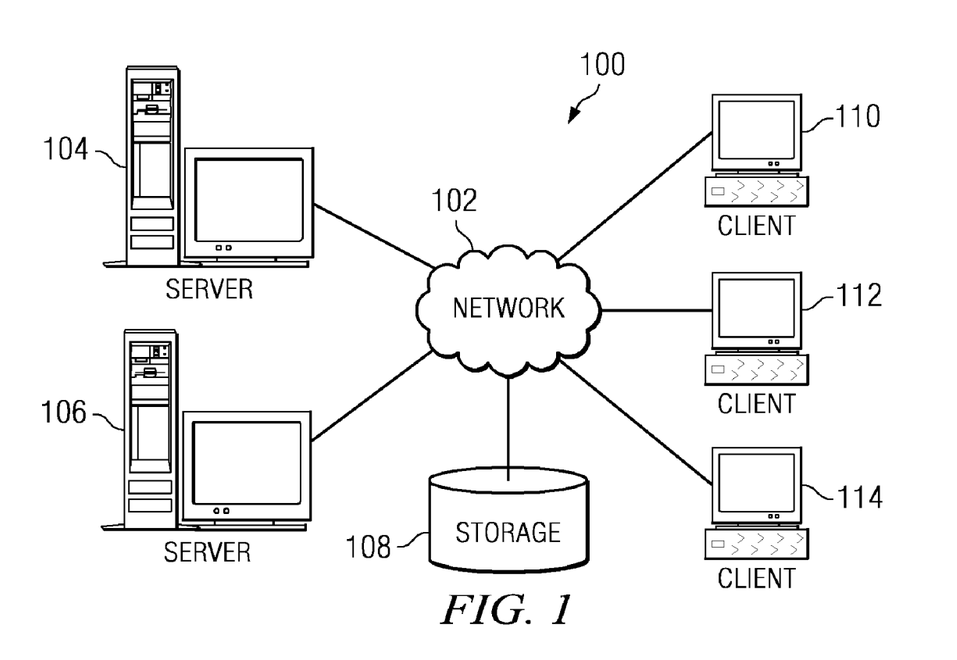
FIG. 1 depicts a pictorial representation of a distributed data processing system in which the illustrative embodiments may be implemented.
Figure 2:
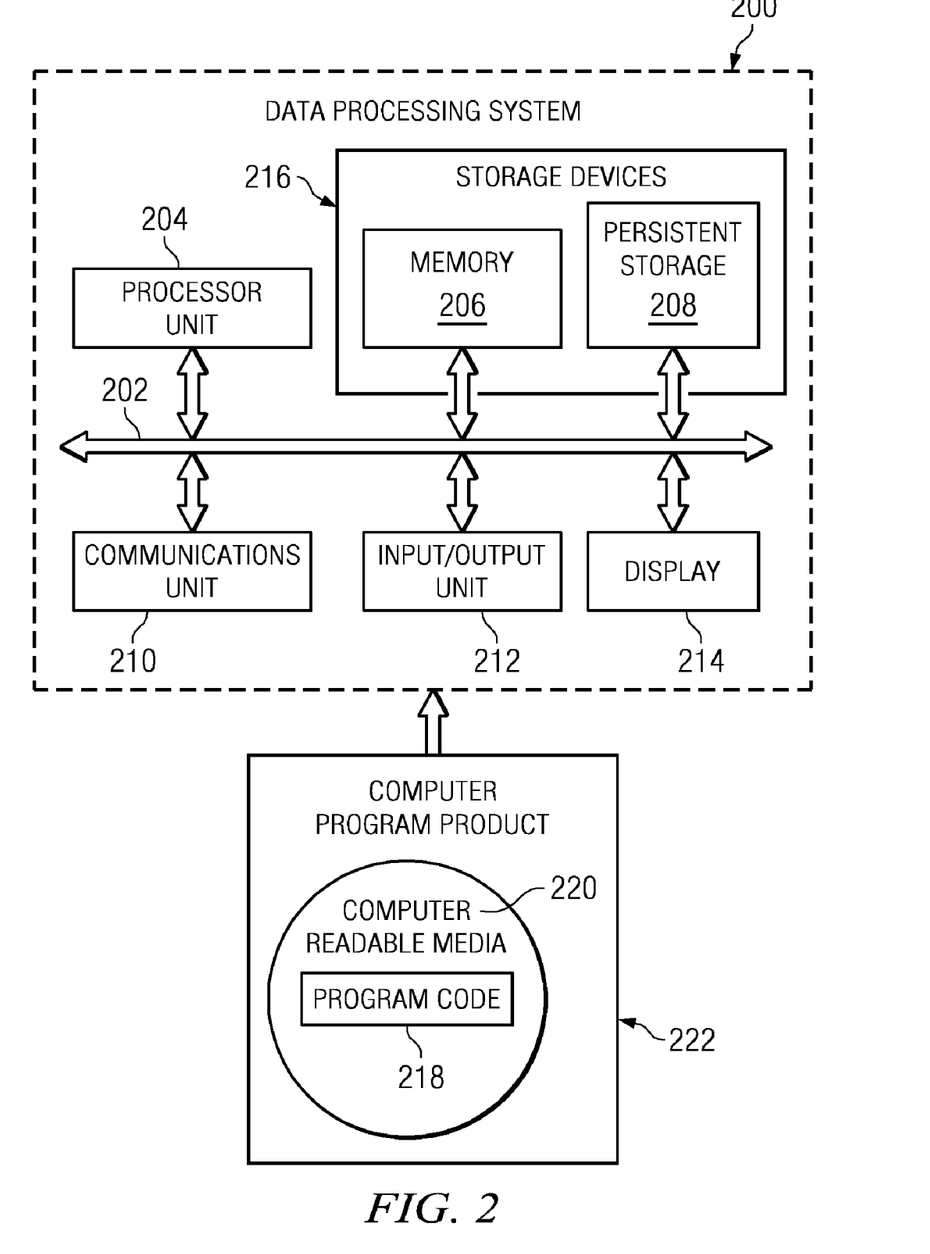
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As previously mentioned, in an agentless management environment, execution code for operating on target resources may be executed in a synchronous manner. A synchronous management operation is one that is initiated from a central management server in the networked environment and 'pushed out' to the agentless agent for execution. The agentless agent translates the management request into a form which is understood by the target managed resource. This form typically leverages the remote API capabilities of the managed resource, and enables the agent to reside on the host machine separate from the managed resource. In a synchronous management operation, data flows from the central management server to the managed resource. The central management server expects a response to be returned from the synchronous operation before initiating another synchronous operation. In contrast, an asynchronous management operation is one that detects events occurring on the managed resource. In an asynchronous management operation, data flows from the managed resource to the central management server. A challenge in an agentless management environment is in how asynchronous operations may be executed at a managed resource, and how their resulting events are to be detected by an agentless agent. For example, the execution of a synchronous operation may result in a long running process workflow on the target managed resource. During this synchronous execution, the central management system should be notified asynchronously about events that occur on the managed resource. In the particular example case of scheduled data reconciliation operations or real-time event notification, the synchronous management execution code needs to run constantly on one of the resources. A further example case is when a user or automated processes synchronously execute actions on the target managed resource. These actions may trigger events which the central management server is notified of asynchronously via the agentless agent.

Existing solutions to enable asynchronous operations to be executed in an agentless management environment include performing the installation of the asynchronous execution code at the agentless agent execution point and the execution of the code as separate distribution modules, thereby enabling the asynchronous operations to be executed. However, as the installations of synchronous and asynchronous agent functionality are implemented and executed separately, this solution is prone to error and more complex to maintain. Another existing solution to enable asynchronous operations to be executed in an agentless management environment is performed in a clustered network environment. In a clustered environment, every node of the system is a potential execution point, where resource management execution code may be installed, executed, and deleted as required. In existing clustered environment methods, execution code modules comprising the execution code are installed and run on one clustered node. However, this approach does not provide high availability, as the clustered node in which the execution modules are installed becomes a single point of failure. Alternatively, an instance of execution code can be installed on each clustered node and started with a failover mechanism implemented separately. However, this approach suffers from complexity of deployment when upgrades to each node are required.

The illustrative embodiments provide a solution to the problems above by providing a computer management environment that utilizes existing components of a management system with agentless agents in a clustered environment to provide deployment of all agent functionality from a single central location and in a single combined code module (i.e., both synchronous and asynchronous code) while ensuring high availability. A clustered network environment is one in which the workload of a server may be distributed across multiple machines to support high availability. High availability relates to assigning redundant computing resources to replace allocated computing resources in a failover mode so as to ensure availability of application logic irrespective of any failure conditions which may arise. In clustered environments, a cluster of nodes supports a single computing mission whereas a lead node normally handles the computing mission while the remaining auxiliary nodes remain in waiting for a failover condition arising in the lead node. During node failover, an auxiliary node can be assigned responsibility to continue handling the computing mission so as to relieve the failed lead node. In this regard, the auxiliary node becomes the lead node. To the extent that multiple auxiliary nodes support the lead node in a failover condition, a policy can determine which of the auxiliary nodes should become the lead node during a failover condition.

The agentless management system in the illustrative embodiments enables execution code comprising all synchronous and asynchronous agent functionality to be managed and stored at a central repository in a central management server. As the execution code is maintained in a single, central repository, the agent functionality is easier to maintain than in existing systems. The agentless agents and upgrades to the agentless agents are managed as standard agentless agent installation/upgrades. When the management operation code is executed on arbitrary execution nodes in the agent execution cluster, the agentless agents will upload/retrieve and execute any new versions of the management operation code. As a result, the agentless agent management system does not require upgrading of the execution code on nodes throughout the cluster.

To manage target resources in the agentless management system, the solution described in the illustrative embodiments implements and packages the synchronous and asynchronous agent functional components in execution code modules at a central location (e.g., at a central management server). The execution code modules and the standard agentless agents may be persisted in the central repository at the management server. At the central management server, a user may deploy synchronous and asynchronous code in a single combined module to an agent execution point, and the code may be executed by a code executor running on an execution point (e.g., a clustered node). In a synchronous operation, an agentless agent deployed to an execution point in the node cluster operates in the standard manner by uploading an execution code module to the execution point, executing the synchronous operation in the execution code module on the managed resource, and then sending a response from executing the synchronous operation back to the management server. In one embodiment, the execution code may be cached at the execution point. In an asynchronous operation, the agentless agent deployed to the execution point uploads an execution code module to the execution point and executes the asynchronous operation in the execution code module to detect events occurring on the managed resource.

Additionally, the solution described in the illustrative embodiments utilizes an agentless agent execution cluster and messaging service to provide multiple code execution points and ensure high availability in the event of a node failure during an asynchronous operation. An execution context state table is maintained at each execution point. The execution context comprises information that may be used to identify or manage a particular asynchronous operation. Information within the execution context of an asynchronous operation may be used to indicate the current execution state of the operation. As an asynchronous operation executes at an agent node to monitor and detect events occurring on a target resource, an execution context state manager in the node updates the operation's execution context in that node's execution context state table. The execution context state manager then propagates the updated execution state context to the other nodes in the cluster. Thus, by maintaining the execution context of asynchronous operation code at each of the execution points, the execution state information of the asynchronous operations is managed in a non-central location and manner. When the asynchronous operation has completed, the operation code is removed from the node, the execution state of the operation is updated in the node's execution state table as "complete", and the updated execution state of the completed operation is also propagated to other cluster nodes.

The other nodes may use the information in the operation's execution context to upload and restart the asynchronous operation code if necessary. For instance, if a clustered node that is an execution point fails, the agentless management system in the illustrative embodiment allows another node in the clustered environment to assume the role of the failed node and deploy all asynchronous code identified in the node's execution context state table as having an "incomplete" execution state. In other words, if the clustered node executing the code (lead node) fails during execution of an asynchronous operation code, the execution code module comprising the asynchronous operation code can be uploaded from the management servers code repository and executed on another node (auxiliary node). Context distribution and failover mechanism of the operational code may be facilitated through the method described in U.S. patent application Ser. No. 11/944,574, entitled "De-Centralized Nodal Failover Handling", filed on Nov. 23, 2007, and herein incorporated by reference in its entirety.

Figure 3:
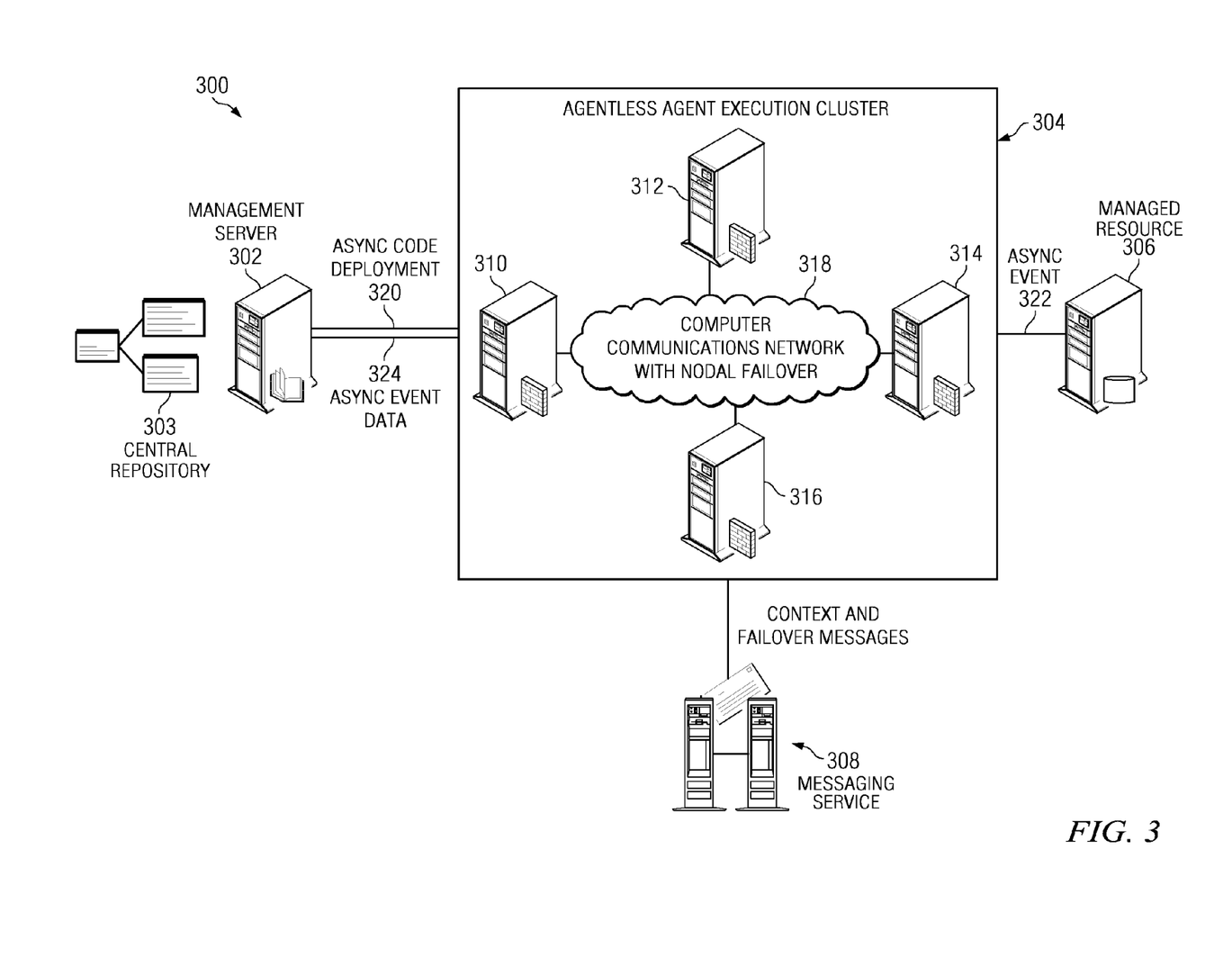
FIG. 3 is a block diagram illustrating an exemplary agentless management system in which the illustrative embodiments may be implemented.

FIG. 3 is a block diagram illustrating an exemplary agentless management system in which the illustrative embodiments may be implemented. Agentless management system 300 may be implemented in a network of data processing systems, such as network data processing system 100 in FIG. 1. Agentless management system 300 is a data processing system that utilizes existing components of a management system with agentless agents to deploy all agent functionality from a single central location in a single combined module. In this illustrative example, agentless management system 300 includes management server 302, agentless agent execution cluster 304, managed resource 306, and messaging service 308. However, it should be noted that agentless management system 300 is only meant as an example and not intended as a limitation on different illustrative embodiments. In other words, agentless management system 300 may include more or fewer components as necessary to accomplish processes of the different illustrative embodiments.

Management server 302 is an example of a server-side data processing system, such as server 104 and 106 in FIG. 1. Management server 302 is responsible for providing a single, central location for managing and storing synchronous and asynchronous system management execution code. The synchronous and asynchronous execution code is used to manage one or more resources in agentless management system 300, such as managed resource 306. Managed resource 306 is an example of any type of computer device or peripheral, including personal computers such as clients 110, 112, and 114 in FIG. 1, other servers, workstations, mainframes, or other network devices.

Management server 302 provides a central repository 303 for storing the synchronous and asynchronous execution code in execution code module packages, as well as for storing the standard agentless agents. Management server 302 may deploy the agentless agents to execution points in agentless management system 300. For example, the agentless agents may be deployed to nodes 310-316 in agentless agent execution cluster 304. Management server 302 may also provide the synchronous and asynchronous execution code to one of nodes 310-316 in agentless agent execution cluster 304 for execution by the agentless agents.

Agentless agent execution cluster 304 is coupled to management server 302 and comprises a collection of one or more synchronous and asynchronous code execution points for managing resources in agentless management system 300. In this illustrative example, the execution points are nodes 310-316 coupled to one another in a cluster over computer communications network 318. Nodes 310-316 are examples of any type of computer device or peripheral, including personal computers, other servers, workstations, mainframes, or other network devices. An agentless agent deployed by management server 302 to an execution point may upload an execution code module comprising the synchronous or asynchronous execution code from management server 302. For example, as previously mentioned, an asynchronous management operation is one that detects an event that has occurred on the managed resource. In an asynchronous management operation, data flows from the managed resource to the central management server. For example, management server 302 may deploy asynchronous execution code 320 to node 310 in agentless agent execution cluster 304 to monitor managed resource 306. The agentless agent deployed to node 310 invokes a code executor which runs the asynchronous execution code to detect asynchronous events 322 occurring at managed resource 306. When execution code detects the occurrence of asynchronous events 322 at managed resource 306, the agentless agent sends the detected asynchronous event data 324 back to management server 302, which may take various actions based on the event data received. The action(s) taken by the management server may depend on the type of the management system.

Agentless agent execution cluster 304 is maintained and managed to ensure high availability in case of nodal failover. Agentless agent execution cluster 304 may include an initial lead node (e.g., node 310) and remaining auxiliary nodes (e.g., nodes 312-316). Agentless agent execution cluster 304 may provide de-centralized nodal failover handling in which an auxiliary node is assigned responsibility to continue handling a computing operation so as to relieve a failed lead node using messaging service 308 coupled to each of the nodes.

Figure 4:
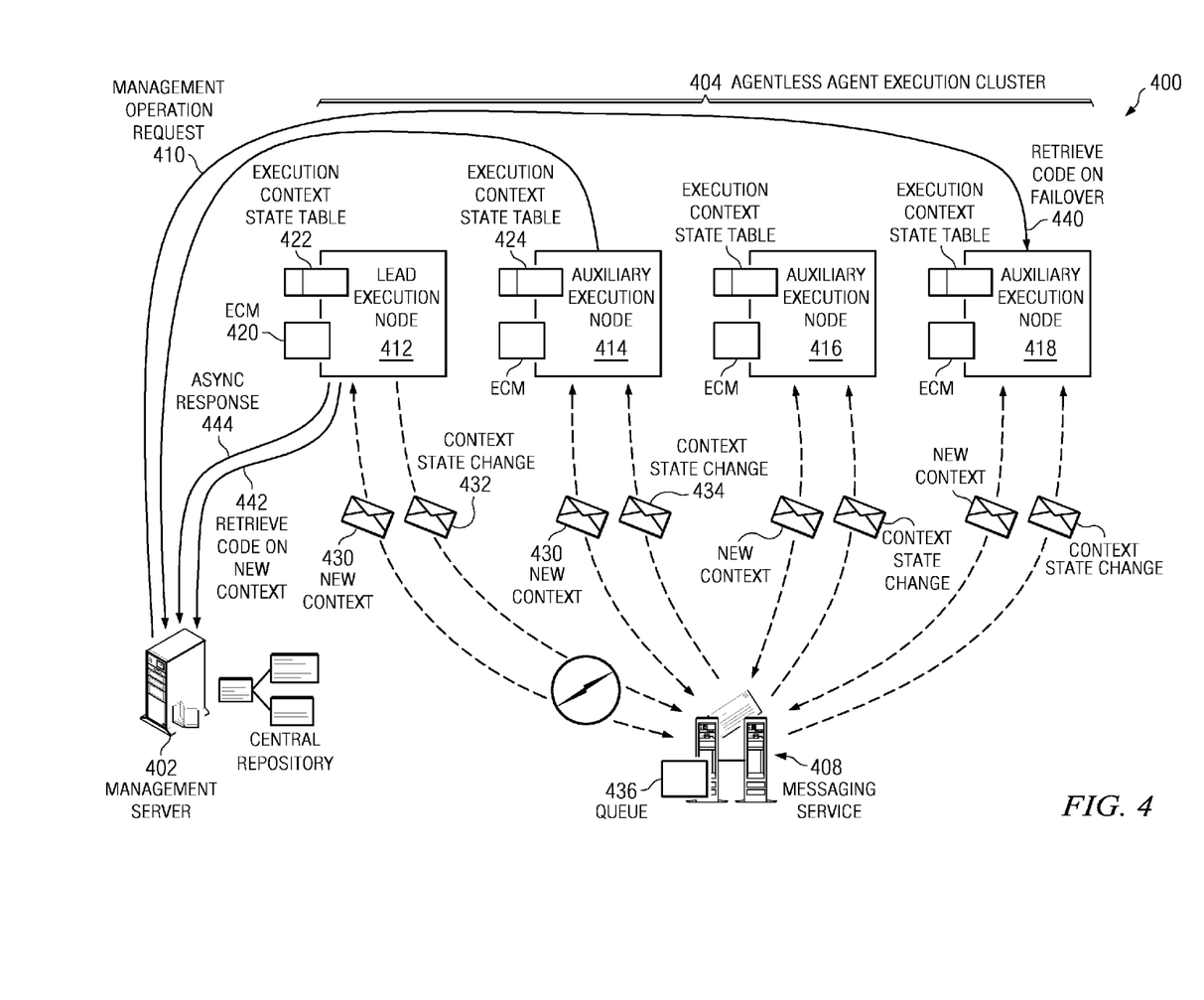
FIG. 4 is a block diagram further illustrating the exemplary agentless management system in accordance with the illustrative embodiments.

FIG. 4 is a block diagram further illustrating the exemplary agentless management system in accordance with the illustrative embodiments. Agentless management system 400 provides synchronous and asynchronous agentless agent functionality from a single central location and deployment to a managed resource in a single combined module, as well as utilizes a high availability computing architecture configured for de-centralized agent nodal failover handling. Agentless management system 400 is shown to comprise management server 402, agent execution cluster 404 and messaging service 408, although it should be noted that agentless management system 400 may include more or fewer components as necessary to accomplish processes of the different illustrative embodiments.

In agentless management system 400, management server 402 and agent execution cluster 404 are started as required. Management server 402 sends a management operation request 410 to an arbitrary agent node in agent execution cluster 404. The arbitrary agent node may be a lead execution node (e.g., lead node 412) or an auxiliary execution node (e.g., auxiliary nodes 414, 416, or 418). Management operation request 410 may comprise synchronous and asynchronous operations. If the management operation request includes an asynchronous operation, the request will contain an initial execution context for the required asynchronous operation.

An execution context may include information that may be used to identify or manage a particular asynchronous operation. For example, an execution context may comprise, but is not limited to, one or more of the following information elements: an asynchronous code module reference, an execution state indicator, configuration or connection information of the managed resource, and execution module specific data. An asynchronous code module reference may comprise an identifier (e.g., name) known by management server 402. The execution state indicator reflects the current state of the associated management operation. Execution states are dependent on the given application or embodiment. Example execution states include, but are not limited to, "not started", "started", "last record processed", "complete", and "incomplete". The configuration or connection information of the managed resource may be utilized by the agent node when executing synchronous code against the resource or when monitoring the resource for asynchronous events. This information is used by the agent to identify the managed resource, and to initialize and provide execution parameters for the execution code module.

When the arbitrary execution node (lead or auxiliary) receives management operation request 410 containing an execution context from management server 402, a distributed execution context manager (ECM) 420 within the arbitrary execution node creates a new execution context entry in the execution context state table 422 within the node. An instance of the distributed execution context manager 420 runs within each node in agent execution cluster 404. The distributed execution context manager 420 in each node is responsible for managing the execution context state for the management operation executed by the node, recording any changes in the execution context state in the node's execution context state table, and distributing these changes to the other nodes in agent execution cluster 404 in a new context message (e.g., message 430) The arbitrary execution node uses messaging service 408 to propagate the newly created context entry in a new context message (e.g., messages 430) throughout the other nodes in the cluster.

Any one of the nodes in agent cluster environment 404 may be designated the lead node 412, while the remaining nodes may be designated as auxiliary nodes 414, 416, 418. In one embodiment, management server 402 may issue a new asynchronous operation execution request to any node in the cluster. When lead execution node 412 receives a context message (e.g., message 430) containing the new context entry from messaging service 408, lead execution node 412 uploads (e.g., 442) the asynchronous code corresponding to the execution context in the message from the central repository at management server 402. This asynchronous execution code may be removed from the node after the code is run or if the lead node fails (e.g., 440). Lead execution node 412 then executes the asynchronous execution code. As lead execution node 412 executes the asynchronous code, asynchronous event data from the managed resource (such as managed resource 306 in FIG. 3) is sent (e.g., 444) to management server 402. Additionally, execution context manager 420 on lead execution node 412 updates the execution state of the asynchronous operation in execution context state table 422.

Each of nodes 412, 414, 416, 418 may include a messaging interface to messaging service 408, for example a Java™ Messaging Service (JMS) server. (Java and all Java-based trademarks and logos are trademarks of Sun Microsystems, Inc. in the United States, other countries, or both). Through their respective messaging interfaces, each node may subscribe to and receive messages from messaging service 408 and also publish messages to messaging service 408 for receipt by the other nodes in the cluster. For example, if the execution state of an asynchronous operation executed by lead execution node 412 changes, the execution context manager at the node updates the node's execution context state table and sends a context state change message (e.g., message 432) containing the updated context state to messaging service 408. Messaging service 408 propagates the updated context state of the asynchronous operation by sending a context state change message (e.g., message 434) containing the updated context state to each of auxiliary nodes 414, 416, and 418. Each auxiliary node then records this context information in its own execution context state table.

Each of the nodes and messaging service 408 may comprise nodal failover handling logic which includes program code enabled to periodically receive, from message service 408, heartbeat messages published by lead node 412 to messaging service 408. When a lapse in the heartbeat messages is detected by the auxiliary nodes, the failover handling logic of the auxiliary nodes individually publishes a request message to messaging service to become a replacement lead node. In one embodiment, messaging service 408 may include a queue 436 into which inbound published messages are stored and queued prior to distribution to the other nodes in the cluster. If queue 436 processes messages on a first-in first-out basis, the first of the replacement request messages received in queue 436 will also be received by auxiliary nodes 414, 416, 418, causing the remaining auxiliary nodes to acquiesce the replacement lead node status to the auxiliary node that send the first request message. Thus, if at any point in the execution of the asynchronous operation the lead execution node 412 fails, one of auxiliary execution nodes 414, 416, 418 in the cluster may assume the lead execution node role as a replacement lead node.

On nodal failover, the replacement lead node is assigned. The replacement lead node checks the node's execution context state table execution context state to identify all asynchronous operations executing on the failed lead node that did not complete. For example, replacement lead node 414 may determine if execution context state table 424 indicates that execution state of any asynchronous operations that were executing on the failed lead node are in an incomplete state. An incomplete state is an execution state of the asynchronous operation at which the lead node's code module execution was in prior to failure. For those asynchronous operations having an incomplete execution state, the replacement lead node uploads the corresponding asynchronous execution code modules from management server 402. Once uploaded, the asynchronous execution code modules are restarted by the replacement lead node based on the associated current execution context of each asynchronous operation. In this manner, the replacement lead node may use the information in the operation's execution context to upload and restart the asynchronous operation code if necessary to provide high availability.

Figure 5:
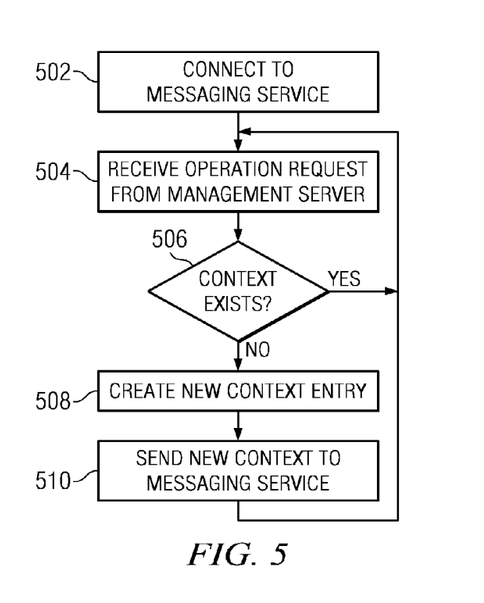
FIG. 5 is a flowchart of a process implemented at an agent node for handling a management operation request received from the management server in accordance with the illustrative embodiments.

FIG. 5 is a flowchart illustrating a process implemented at an agent node for handling a new operation request received from the management server in accordance with the illustrative embodiments. The process described in FIG. 5 may be implemented at any arbitrary execution point in the clustered node environment, such as agent nodes 310, 312, 314, or 316 in agent execution cluster 304 in FIG. 3. In one embodiment, the process may be implemented when a new synchronous or asynchronous code module packages are installed onto the central management server, and the management server needs to have these code modules executed by the agent nodes.

The process begins with an agentless agent deployed at an arbitrary agent node in the agent execution cluster connecting to the messaging service, such as messaging service 308 in FIG. 3 (step 502). For example, during initialization of the execution code module, configuration parameters will provide the details of how to subscribe to the messaging service. The agent node receives a management operation request from the management server, such as management server 302 in FIG. 3 (step 504). For instance, the management operation request may comprise an asynchronous operation to be executed against a managed resource. Upon receiving the operation request, the agent node determines if an execution state context entry for the operation request already exists in the agent node's execution state context table (step 506). For example, the agent node may check if the context entry with the request reference identifier or asynchronous code module name reference already exists in the table. The execution context of an operation comprises information indicating the current state of the requested operation. If an execution context entry for the particular operation request already exists in the execution state context table ('yes' output of step 506), the process returns to step 504 to wait for another operation request from the management server. However, if there is no execution state context for the particular operation request in the execution state context table ('no' output of step 506), the agent node creates a new context entry in the node's execution state context table for the operation request and populates the new context entry with context information (including the execution state) for the requested operation (step 508). The agent node then sends the new context to the messaging service to propagate this new context entry to all other agent nodes in the agent execution cluster (step 510), and returns to step 504.

Figure 6:
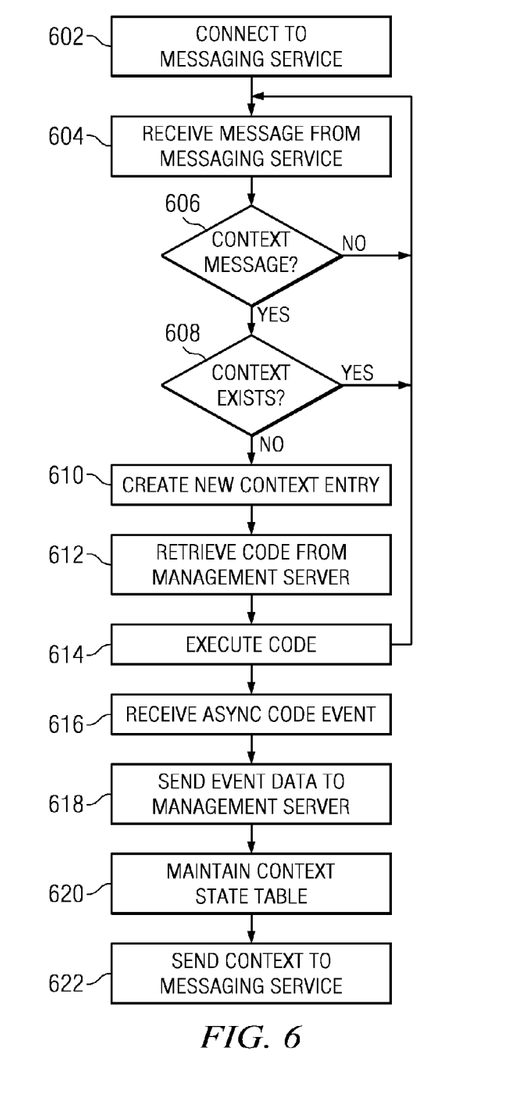
FIG. 6 is a flowchart of a process implemented by a lead agent node in the agent execution cluster in accordance with the illustrative embodiments.

FIG. 6 illustrates a flowchart of a process implemented by a lead agent node in the agent execution cluster in accordance with the illustrative embodiments. The process described in FIG. 6 may be implemented by the lead agent node when the lead agent node receives a context message from the messaging service. The process begins with the lead agent node in the agent execution cluster connecting to the messaging service, such as messaging service 308 in FIG. 3 (step 602). The agent node then receives a message from the messaging service (step 604). Upon receiving the message, the lead agent node determines if the received message is an execution context message (step 606).

If the received message is not an execution context message ('no' output of step 606), the process returns to step 604 to wait for another message from the messaging service. However, if the received message is an execution context message ('yes' output of step 606), the lead agent node determines if a context entry for the management operation request specified in the message already exists in the execution context state table in the agent node (step 608). If a context for the management operation request already exists in the execution context state table in the lead agent node ('yes' output of step 608), the process returns to step 604 to wait for another message from the messaging service. However, if there is no context entry for the management operation request in the execution context state table ('no' output of step 608), the lead agent node creates a new context entry in the node's execution state context table for the management operation request specified in the message (step 610). The lead agent node then retrieves the asynchronous execution code for performing the requested management operation from the central repository at the management server (step 612). The agentless agent in the lead agent node executes the retrieved asynchronous code to detect events occurring on the managed target resource (step 614).

At step 614, the lead agent node branches in two processes—the node returns to step 604 and continues to listen for messages from other nodes in the agent execution cluster via the messaging service, as well as monitor and receive asynchronous code events from the managed resource (step 616). Upon receiving the asynchronous code events, the agent node sends the event data back to the management server (step 618). The agent node maintains the execution context state table by updating the context entry with the current context state of the management operation request (step 620). For example, when the event data is sent to the management server, the agent node may update the context entry for the management operation to reflect a completed state. Once the context for the management operation is updated in the lead agent node's execution context state table, the lead agent node sends the updated context to the message service to propagate the updated context to all other agent nodes in the agent execution cluster (step 622).

Figure 7:
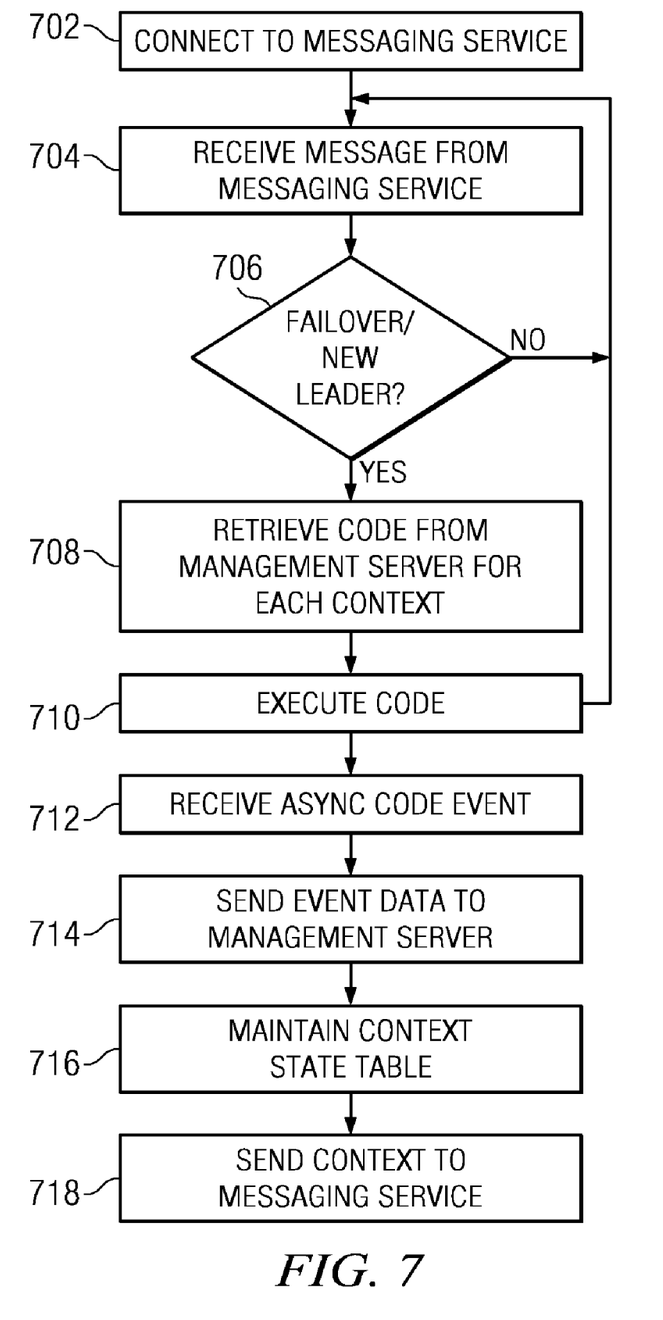
FIG. 7 is a flowchart of a process implemented by an auxiliary node in the agent execution cluster in accordance with the illustrative embodiments.

FIG. 7 illustrates a flowchart of a process implemented within an auxiliary node in the agent execution cluster in accordance with the illustrative embodiments. The process described in FIG. 6 may be implemented by an auxiliary node when the auxiliary node receives a failover message for a management operation from the messaging service. In this process, the auxiliary node becomes the new replacement lead node for the management operation.

The process begins with an auxiliary agent node in the agent execution cluster connecting to the messaging service (step 702). The auxiliary agent node then receives a message from the messaging service (step 704). Upon receiving the message, the auxiliary agent node determines if the received message indicates a failover procedure is to be performed by the auxiliary agent node (step 706). A failover may comprise a backup operational mode in which management operations executed by the lead agent node are assumed by an auxiliary agent node in the agent execution cluster when the lead node becomes unavailable through either failure or scheduled down time. If the received message does not indicate a failover procedure is to be performed by the auxiliary agent node ('no' output of step 706), the process returns to step 704 to wait and listen for other messages from the messaging service. However, if the message received by the auxiliary agent node indicates the auxiliary agent node is to assume the management operations running on the lead agent node ('yes' output of step 706), the auxiliary agent node (now the replacement lead node) retrieves the asynchronous execution code from the central repository at the management server for each execution context specified in the node's execution context state table (step 708). The replacement lead node executes the retrieved asynchronous code module to detect events occurring on the managed target resource (step 710).

At step 710, the replacement lead node branches in two processes—the node returns to step 704 to continue to wait and listen for messages from other nodes in the agent execution cluster via the messaging service, as well as monitor and receive asynchronous code events from the managed resource (step 712). When the replacement lead node receives asynchronous code events from the managed resource, the replacement lead node sends the event data in a message back to the management server (step 714). The replacement lead node maintains the node's execution context state table by updating the context entries with the current context states of the management operation requests (step 716). Once the context for the management operation is updated in the replacement lead node's execution context state table, the replacement lead node sends the updated context to the message service to propagate the context to all other agent nodes in the agent execution cluster (step 718).

The flowchart and block diagrams in the Figures illustrate the architecture, functionality, and operation of possible implementations of systems, methods and computer program products according to various embodiments of the disclosure. In this regard, each block in the flowchart or block diagrams may represent a module, segment, or portion of code which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "and" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments in the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The invention can also take the form of a computer program product which has been downloaded over a network from one device to another for use in the other device. For instance, the program code stored in a computer readable storage medium in a server data processing system may be downloaded over a network from the server to a remote data processing system, such as a client or another server. Likewise, the program code stored in a computer readable storage medium in a client data processing system may be downloaded over a network from the client to a remote data processing system, such as a server or another client.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the embodiments in the disclosure has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for deploying asynchronous agentless agent functionality in a clustered node environment, the computer implemented method comprising:
    receiving, at an agentless agent execution node in an agentless agent execution node cluster, a context message from a messaging service, wherein the context message includes a management operation request comprising an asynchronous operation and an execution context of the asynchronous operation;
    determining, by the agentless agent execution node, if an entry for the execution context exists in an execution context state table of the agentless agent execution node;
    responsive to a determination that no entry for the execution context exists, creating an entry for the execution context in the execution context state table of the agentless agent execution node;
    retrieving an asynchronous code module associated with the asynchronous operation in the management operation request from a central repository;
    executing the asynchronous code module on a managed resource to detect asynchronous code events occurring on the managed resource; and
    responsive to detecting asynchronous code events at the managed resource, sending a message comprising the asynchronous code events to a management server.

2. The computer implemented method of claim 1, further comprising:
updating an execution state in the execution context entry of the asynchronous operation in the execution context state table of the agentless agent execution node; and
propagating, via the messaging service, the updated execution state to auxiliary agentless agent execution nodes in the agentless agent execution node cluster.

3. The computer implemented method of claim 2, further comprising:
receiving, at an auxiliary agentless agent execution node in the agentless agent execution node cluster, a context message from the messaging service, wherein the context message comprises the updated execution state of the asynchronous operation; and
updating the execution state in the execution context entry of the asynchronous operation in the execution context state table of the auxiliary agentless agent execution node.

4. The computer implemented method of claim 3, further comprising:
receiving, at the auxiliary agentless agent execution node in the agentless agent execution node cluster, a failover message from the messaging service, wherein the failover message specifies the auxiliary node assume asynchronous operations executing on a failed agentless agent execution node;
identifying an execution context in an execution context state table of the auxiliary agentless agent execution node for each asynchronous operation running on the failed agentless agent execution node;
retrieving asynchronous code modules associated with the asynchronous operations for each identified execution context;
executing the asynchronous code module on the managed resource for detecting asynchronous code events occurring on the managed resource; and
responsive to detecting asynchronous code events at the managed resource, sending a message comprising the asynchronous code events to the management server.

5. The computer implemented method of claim 4, further comprising:
updating an execution state in the execution context entry of the asynchronous operation in the execution context state table of the auxiliary agentless agent execution node; and
propagating, via the messaging service, the updated execution state to auxiliary agentless agent execution nodes in the agentless agent execution node cluster.

6. The computer implemented method of claim 1, wherein the execution context comprises information used to manage the asynchronous operation, and wherein the execution context comprises at least one of an asynchronous code module reference comprising a code module identifier known by the management server, an execution state indicator reflecting a current state of the asynchronous operation, configuration or connection information of the managed resource used by the agentless agent execution node to identify the managed resource and provide execution parameters for the asynchronous code module.

7. The computer implemented method of claim 1, wherein an instance of a distributed execution context state manager runs within each of multiple ones of the agentless agent execution node in the agentless agent execution node cluster, and wherein the distributed execution context manager within an agentless agent execution node creates the entry for the execution context in the execution context state table within the agentless agent execution node.

8. An apparatus, comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to receive, at an agentless agent execution node in an agentless agent execution node cluster, a context message from a messaging service, wherein the context message includes a management operation request comprising an asynchronous operation and an execution context of the asynchronous operation; determine if an entry for the execution context exists in an execution context state table of the agentless agent execution node; create, in response to a determination that no entry for the execution context exists, an entry for the execution context in the execution context state table of the agentless agent execution node; retrieve an asynchronous code module associated with the asynchronous operation in the management operation request from a central repository; execute the asynchronous code module on a managed resource to detect asynchronous code events occurring on the managed resource; and send, in response to detecting asynchronous code events at the managed resource, a message comprising the asynchronous code events to a management server.

9. The apparatus of claim 8, wherein the processing unit further executes the computer usable code to update an execution state in the execution context entry of the asynchronous operation in the execution context state table of the agentless agent execution node; and propagate, via the messaging service, the updated execution state to auxiliary agentless agent execution nodes in the agentless agent execution node cluster.

10. The apparatus of claim 9, wherein the processing unit further executes the computer usable code to receive, at an auxiliary agentless agent execution node in the agentless agent execution node cluster, a context message from the messaging service, wherein the context message comprises the updated execution state of the asynchronous operation; and update the execution state in the execution context entry of the asynchronous operation in the execution context state table of the auxiliary agentless agent execution node.

11. The apparatus of claim 10, wherein the processing unit further executes the computer usable code to receive, at the auxiliary agentless agent execution node in the agentless agent execution node cluster, a failover message from the messaging service, wherein the failover message specifies the auxiliary node assume asynchronous operations executing on a failed agentless agent execution node; identify an execution context in an execution context state table of the auxiliary agentless agent execution node for each asynchronous operation running on the failed agentless agent execution node; retrieve asynchronous code modules associated with the asynchronous operations for each identified execution context; execute the asynchronous code module on the managed resource for detecting asynchronous code events occurring on the managed resource; and send, in response to detecting asynchronous code events at the managed resource, a message comprising the asynchronous code events to the management server.

12. The apparatus of claim 11, wherein the processing unit further executes the computer usable code to update an execution state in the execution context entry of the asynchronous operation in the execution context state table of the auxiliary agentless agent execution node; and propagate, via the messaging service, the updated execution state to auxiliary agentless agent execution nodes in the agentless agent execution node cluster.

13. The apparatus of claim 8, wherein the execution context comprises information used to manage the asynchronous operation, and wherein the execution context comprises at least one of an asynchronous code module reference comprising a code module identifier known by the management server, an execution state indicator reflecting a current state of the asynchronous operation, configuration or connection information of the managed resource used by the agentless agent execution node to identify the managed resource and provide execution parameters for the asynchronous code module.

14. A computer program product for deploying asynchronous agentless agent functionality in a clustered node environment, the computer program product comprising:
    a tangible computer usable storage device having computer usable program code tangibly stored thereon, the computer usable program code comprising:
    computer usable program code for receiving, at an agentless agent execution node in an agentless agent execution node cluster, a context message from a messaging service, wherein the context message includes a management operation request comprising an asynchronous operation and an execution context of the asynchronous operation;
    computer usable program code for determining if an entry for the execution context exists in an execution context state table of the agentless agent execution node;
    computer usable program code for creating, in response to a determination that no entry for the execution context exists, an entry for the execution context in the execution context state table of the agentless agent execution node;
    computer usable program code for retrieving an asynchronous code module associated with the asynchronous operation in the management operation request from a central repository;
    computer usable program code for executing the asynchronous code module on a managed resource to detect asynchronous code events occurring on the managed resource; and
    computer usable program code for sending, in response to detecting asynchronous code events at the managed resource, a message comprising the asynchronous code events to a management server.

15. The computer program product of claim 14, further comprising:
    computer usable program code for updating an execution state in the execution context entry of the asynchronous operation in the execution context state table of the agentless agent execution node; and
    computer usable program code for propagating, via the messaging service, the updated execution state to auxiliary agentless agent execution nodes in the agentless agent execution node cluster.

16. The computer program product of claim 15, further comprising:
    computer usable program code for receiving, at an auxiliary agentless agent execution node in the agentless agent execution node cluster, a context message from the messaging service, wherein the context message comprises the updated execution state of the asynchronous operation; and
    computer usable program code for updating the execution state in the execution context entry of the asynchronous operation in the execution context state table of the auxiliary agentless agent execution node.

17. The computer program product of claim 16, further comprising:
    computer usable program code for receiving, at the auxiliary agentless agent execution node in the agentless agent execution node cluster, a failover message from the messaging service, wherein the failover message specifies the auxiliary node assume asynchronous operations executing on a failed agentless agent execution node;
    computer usable program code for identifying an execution context in an execution context state table of the auxiliary agentless agent execution node for each asynchronous operation running on the failed agentless agent execution node;
    computer usable program code for retrieving asynchronous code modules associated with the asynchronous operations for each identified execution context;
    computer usable program code for executing the asynchronous code module on the managed resource for detecting asynchronous code events occurring on the managed resource; and
    computer usable program code for sending, in response to detecting asynchronous code events at the managed resource, a message comprising the asynchronous code events to the management server.

18. The computer program product of claim 17, further comprising:
    computer usable program code for updating an execution state in the execution context entry of the asynchronous operation in the execution context state table of the auxiliary agentless agent execution node; and
    computer usable program code for propagating, via the messaging service, the updated execution state to auxiliary agentless agent execution nodes in the agentless agent execution node cluster.

19. The computer program product of claim 14, wherein the execution context comprises information used to manage the asynchronous operation, and wherein the execution context comprises at least one of an asynchronous code module reference comprising a code module identifier known by the management server, an execution state indicator reflecting a current state of the asynchronous operation, configuration or connection information of the managed resource used by the agentless agent execution node to identify the managed resource and provide execution parameters for the asynchronous code module.

20. The computer program product of claim 14, wherein an instance of a distributed execution context state manager runs within each of multiple ones of the agentless agent execution node in the agentless agent execution node cluster, and wherein the distributed execution context manager within an agentless agent execution node creates the entry for the execution context in the execution context state table within the agentless agent execution node.

* * * * *